(12) United States Patent
Andreis et al.

(10) Patent No.: US 10,448,782 B2
(45) Date of Patent: Oct. 22, 2019

(54) AUTOMATIC APPARATUS FOR HEATING AND FROTHING MILK AND RELATED METHOD

(71) Applicant: F-LAB S.R.L., Corsico (IT)

(72) Inventors: Diego Andreis, Milan (IT); Andrea Coccia, Pavia (IT)

(73) Assignee: F-LAB S.R.L., Corsico (MI) (IT)

( * ) Notice: Subject to any disclaimer, the term of this patent is extended or adjusted under 35 U.S.C. 154(b) by 337 days.

(21) Appl. No.: 15/603,555

(22) Filed: May 24, 2017

(65) Prior Publication Data

US 2017/0340161 A1 Nov. 30, 2017

(30) Foreign Application Priority Data

May 27, 2016 (IT) .................. 102016000054795

(51) Int. Cl.
*A47J 31/30* (2006.01)
*A47J 31/44* (2006.01)
*A47J 31/56* (2006.01)

(52) U.S. Cl.
CPC ....... *A47J 31/4485* (2013.01); *A47J 31/4489* (2013.01); *A47J 31/56* (2013.01); *A47J 31/30* (2013.01)

(58) Field of Classification Search
CPC ............... A47J 31/4485; A47J 31/4489; A47J 31/0576; A47J 31/30; A47J 31/303
USPC ............................................. 99/293, 323.1
See application file for complete search history.

(56) References Cited

U.S. PATENT DOCUMENTS

| 5,325,764 A * | 7/1994 | Nakamura ............ A47J 31/605 99/282 |
| 6,099,878 A | 8/2000 | Arksey |
| 2005/0172833 A1* | 8/2005 | Ioannone ............ A47J 31/4485 99/453 |
| 2005/0223911 A1 | 10/2005 | Landolt |
| 2009/0165655 A1* | 7/2009 | Aonuma ................ A47J 31/50 99/290 |

(Continued)

FOREIGN PATENT DOCUMENTS

| CN | 201899368 | 7/2011 |
| DE | 202014010272 | 2/2015 |
| EP | 0243326 | 10/1987 |

(Continued)

*Primary Examiner* — Reginald Alexander
(74) *Attorney, Agent, or Firm* — King & Schickli, PLLC

(57) ABSTRACT

An automatic apparatus for heating and frothing milk comprises a device for generating steam for heating the milk, a first high temperature hydraulic circuit, a refrigerating group for maintaining the conservation temperature of the milk, and a second low temperature hydraulic circuit. The refrigerating group includes a milk container and pump for drawing milk therefrom. A first total separation valve separates the second hydraulic circuit from the first hydraulic circuit, a second total separation valve modulates the quantity of air drawn by the pump, a third total separation valve separates both the first hydraulic circuit and the second hydraulic circuit from a milk dispensing circuit, a steam injection device mixes the steam with the frothed milk, and a fourth total separation valve modulates the quantity of steam outlet from the steam generating device. Each total separation valve is provided with an actuator element manufactured with a shape memory alloy.

8 Claims, 2 Drawing Sheets

(56) References Cited

U.S. PATENT DOCUMENTS

2013/0101718 A1\* 4/2013 Kindler .............. A47J 31/4485
426/474
2013/0255660 A1\* 10/2013 Han ........................ F24C 3/087
126/273 R

FOREIGN PATENT DOCUMENTS

| EP | 0485350 A1 | 5/1992 |
| EP | 1501398 | 2/2005 |
| EP | 1593330 B1 | 9/2005 |
| EP | 1776905 B1 | 4/2007 |
| EP | 2060211 A1 | 5/2009 |
| EP | 2120656 B1 | 11/2009 |
| EP | 2583596 A1 | 4/2013 |
| EP | 1785074 B1 | 5/2017 |
| WO | WO2013076634 A1 | 5/2013 |

\* cited by examiner

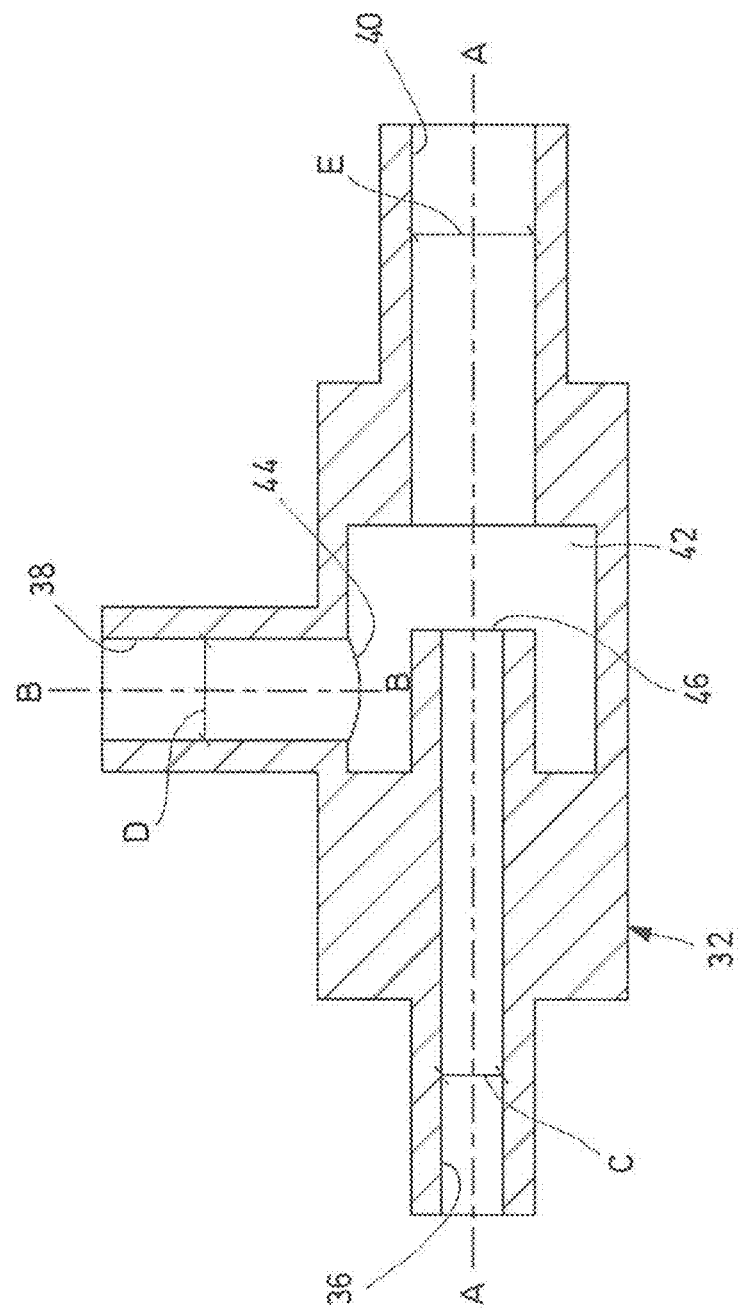

AUTOMATIC APPARATUS FOR HEATING AND FROTHING MILK AND RELATED METHOD

The disclosure of Italian Patent Application No. 102016000054795 is incorporated herein by reference.

TECHNICAL FIELD

The present invention relates to an automatic apparatus for heating and frothing milk and also to a method for heating and frothing milk by means of saturated steam.

BACKGROUND

Milk is a strategic beverage in the field of Italian and world-wide beverage equipment. While milk in Italy plays a significant role limited generally to breakfasts (cappuccino, espresso macchiato and the like), it is used abroad for making many other beverages that are served also after the main meals.

Milk is often "foamed" to make a final two-phase product consisting of a creamy part and of a liquid part which are not immediately separable from each other. A typical example in which frothing the milk is required is the one of preparing the cappuccino. The cappuccino is indeed defined as a hot beverage consisting of a dose of espresso coffee (weighing about 23 g) to which a dose of foamed hot milk is added. This mixture forms the final beverage weighing about 110-120 g.

Normally, the "frothing" operation of the milk is carried out by hand, directly by the barista, through the use of a steam nozzle. This operation requires some attention. Indeed, the serum-proteins that are in the milk are surface-active but thermolabile compounds. By decreasing the surface tension of the fluid and therefore the surface rigidity thereof, the surface activity promotes the frothing of the milk if air is introduced. The thermolability instead causes the existence of a limit temperature, which in the specific case is about 70° C., at which the proteins deteriorate and lose the surface-active behaviour thereof. This deterioration process is an irreversible process: by cooling the milk, the proteins do not reacquire their functional surface-active feature.

The presence of the aforesaid limit temperature is well known to the experts operators in the field. Vice versa, when operators with little experience encounter difficulties in obtaining the frothing of the milk, they normally insist on using the steam nozzle in an attempt to obtain the frothing desired. By doing this, the milk heats past the limit temperature and often is brought to boiling. The increase of the temperature and the breakdown of a sizeable portion of the protein material on the one hand result in an increase of the surface tension and on the other, the boiling of the milk, which results in the formation of a froth consisting of very large bubbles which tend to disappear very quickly.

To avoid these situations, which are not improbable in the technical field of the preparation of hot beverages, various solutions have been introduced which tend to automate the frothing process, with or without the aid of an operator. For example, documents EP 1 501 398 B1 and EP 1 776 905 B1 describe respective improved steam nozzles in which both air, coming from a compressor, and steam, coming from a boiler, are introduced. Although it resolves the manual frothing problem, thus avoiding the overheating of the milk, this solution may not be applied in those specific situations in which the frothing is required of a well-defined dose of milk. A typical case is the one of apparatuses for dispensing beverages operating in self-service mode, typically common in the hotel field.

Various solutions have been developed to deal with the aforesaid specific situations. For example, document EP 0 243 326 B1 describes a device for frothing the milk through the use of the Venturi effect. Although it resolves the problem of the preset dose of milk to be foamed, this device, under particular operating conditions, sometimes has instabilities caused by the reaching of temperatures which may induce the boiling of the milk and the expansion of the drawn air, thus causing a slowing down of the flow with subsequent reduction of the dose in the cup.

Good stability was obtained with the application of a pump, as described in document EP 1 785 074 B1. The milk is forcedly pushed due to the pump, thus forcing the apparatus to always dispense the same dose.

In apparatuses with dosed frothing like the ones described above, the frothing of the milk occurs due to the effect of the air which, in certain cases, is mixed with the milk simultaneously with the steam, and in other cases, is introduced into the flow of milk already heated by the steam coming from the boiler. For the frothing quality of the milk, it may then be suitable to froth a quantity of "cold" milk, then heat the product obtained up to its optimal temperature, which for the Italian cappuccino is about 65° C.

A cold frothing and successive heating process has been known for a long time and is described for example, in document EP 0 485 350 A1. More recently, this process was illustrated also in documents EP 1 593 330 B1 and EP 2 120 656 B1. In this context, a specific quantity of milk taken from a refrigeration unit, is drawn and mixed by a pump with a certain quantity of air. The pump is preferably a gear pump and provides to finely mix the two fluids, so as to obtain a high density milk cream and to send the foamed milk into the cup. In the case of a cold beverage, the sending into the cup occurs directly, or through a further cooling element. In the case of a hot beverage, the sending into the cup occurs through a heating device.

The foamed milk is heated by means of a heat exchanger for the preparation of a hot beverage in the examples mentioned. The use of the heat exchanger however has certain drawbacks. The heating occurs by heat exchange between the walls of the heat exchanger and the flow of milk. This means that in order to quickly transfer the heat to the foamed milk, there is a need to heat the walls of the heat exchanger to a much higher temperature than the final temperature of the milk. This fact leads to the formation on the heat exchanger walls of solid casein deposits (the so-called "milkstone") which alter the taste of the milk and which, in order to be removed, require energetic and frequent washings.

In the case of an apparatus in which there is provided also the dispensing of cold milk, the preparation of a cold beverage immediately following the preparation of a hot beverage may not be carried out with the correct temperature, since the heat exchangers of the type described in documents EP 0 485 350 A1 and EP 1 593 330 B1 are necessarily provided with a significant mass. Indeed, the heat exchanger which has not yet cooled down releases heat to the milk that it comes in contact with. Therefore, there is a need to wait for the cooling of the heat exchanger, or to force a quick cooling thereof, or again to deviate the flow of milk thus avoiding the heat exchanger, but significantly complicating the circuit and thus compromising the features of hygienic quality and washability thereof.

By taking advantage of the increased latent heat of condensation, the steam heating instead allows heating large quantities of milk in a few moments with an increased energy efficiency, and also preserving the flavour qualities of the milk.

Document DE 20 2014 010272 U1 describes an apparatus for heating and frothing milk in which at least one part of the components adapted for the operation of the apparatus itself—such as e.g. the milk pump and the separation valve—is not positioned in a cooled environment, such as e.g. a refrigerator. Also in this case therefore, the preparation of a cold beverage immediately following the preparation of a hot beverage is not always carried out with the correct temperature. Further apparatuses for heating and frothing milk are described for example, in documents U.S. Pat. No. 6,099,878 A and EP 2 060 211 A1.

Finally, document WO 2013/076634 A1 describes an automatic beverage dispenser and a respective system for the production of hot water. The automatic beverage dispenser is provided with a shape memorizing thermostatic valve designed to mitigate the temperature of the hot water without the use of electric power. The thermostatic valve identifies the temperature of the hot and cold water and thermostatically controls the outlet water. No electronic control is provided.

SUMMARY

It is therefore the object of the present invention to make an automatic apparatus for heating and frothing milk which is capable of resolving the drawbacks mentioned above of the known technique in a manner which is highly simple, affordable and particularly rational and functional.

In detail, it is an object of the present invention to make an automatic apparatus for heating and frothing milk which is capable of generating foamed milk, both hot and cold, while keeping the use of the steam as heating means, in order to avoid the drawbacks resulting from the use of a heat exchanger and thus ensuring an increased quality standard of the final beverage.

It is another object of the present invention to make an automatic apparatus for heating and frothing milk which is capable of limiting the number of components used—and therefore the complexity of the circuit—for performing the functions of making the beverage, washing and sanitizing.

It is another object of the present invention to make an automatic apparatus for heating and frothing milk which allows automatically selecting the frothing level of the milk, both hot and cold, through the use of a proportional valve actuated with shape memory alloys which calibrates the quantity of air required for frothing the milk.

It is another object of the present invention to make an automatic apparatus for heating and frothing milk which is capable of obtaining, in an automatic and selectable manner, the hot milk at various temperatures desired through the use of a proportional valve made with shape memory alloys which calibrates the quantity of steam and the related latent heat of condensation.

It is a further object of the present invention to make an automatic apparatus for heating and frothing milk which allows limiting significantly the times and quantities of water required for the wash and rinse operations of the circuits which are carried out at the end of each dispensing operation.

It is another object again of the present invention to make an automatic apparatus for heating and frothing milk which allows automating and simplifying the washing and sanitizing of the circuits, which occur normally at the end of the working day or in any case, at the end of the beverage making operations.

These objects according to the present invention are achieved by making an automatic apparatus for heating and frothing milk as disclosed in claim 1.

Further features of the invention are apparent from the dependent claims, which are an integral part of the present description.

BRIEF DESCRIPTION OF THE DRAWINGS

The features and advantages of an automatic apparatus for heating and frothing milk according to the present invention will be more apparent from the following description, which is to be understood as exemplifying and not limiting, with reference to the schematic attached drawings, wherein:

FIG. 2 is an enlarged section view of a component of the apparatus in FIG. 1.

DETAILED DESCRIPTION

Figure 1:
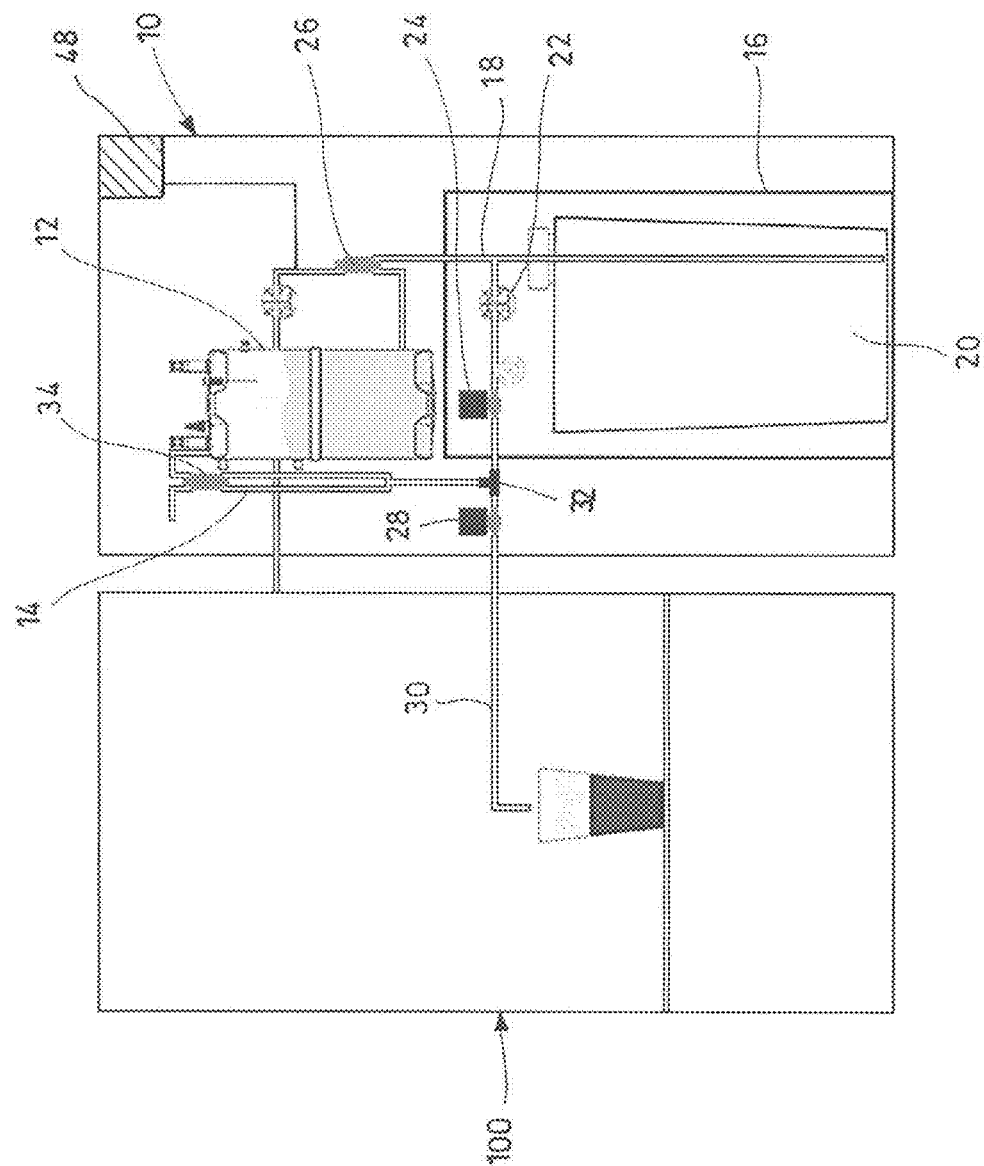
FIG. 1 shows the hydraulic diagram of a preferred example embodiment of the automatic apparatus for heating and frothing milk according to the present invention.

With reference to the figures, there is shown an automatic apparatus for heating and frothing milk according to the present invention, indicated as a whole with reference numeral 10. The apparatus 10 is configured as an automatic and independent module which can be associated with a generic coffee machine 100 such as to carry out the dispensing of the cold and hot foamed milk through such coffee machine 100.

The apparatus 10 comprises a steam generating device 12 consisting of a boiler configured to generate steam for the heating of the milk and for the management of the wash cycles of such apparatus 10, and also a first hydraulic circuit 14 at a high temperature operatively associated with such steam generating device 12. The apparatus 10 further comprises an electronic communication and control board 48 configured to control the operation both of the steam generating device 12 and of the other components of such apparatus 10.

The apparatus 10 also comprises a refrigerating group 16 configured to maintain the ideal milk conservation temperature at 5° C. and operatively associated with a second hydraulic circuit 18 at a low temperature. There are housed inside the refrigerating group 16 at least one milk container 20, at least one pump 22, preferably of the gear type and configured to draw the milk from the container 20, and a first total separation valve 24, preferably two-way, which function is better described below but which mainly performs the separation of the second hydraulic circuit 18 at a low temperature, which is considered "safe" in terms of hygiene and the buildup of bacteria of the milk, from the first hydraulic circuit 14 at a high temperature.

In a first intersection point between the first hydraulic circuit 14 at a high temperature and the second hydraulic circuit 18 at a low temperature, there is interposed a second total separation valve 26, preferably two-way. This second two-way total separation valve 26 is a proportional valve with a double channel. On a first channel, the valve 26 is designed to proportionally modulate the amount of air drawn by the pump 22 so as to obtain a different frothing of the milk for each single dispensing operation. On the second channel, the valve 26 carries out the loading of the water to be introduced into the steam generating device 12.

Downstream of the first hydraulic circuit 14 at a high temperature and of the second hydraulic circuit 18 at a low temperature, there is arranged a third total separation valve 28, preferably two-way. The function of this third two-way total separation valve 28 is the one of separating the main circuits of the apparatus 10, i.e. the first hydraulic circuit 14 at a high temperature and the second hydraulic circuit 18 at a low temperature, from the dispensing circuit 30 arranged outside such apparatus 10 and configured for the hydraulic connection with the coffee machine 100.

In a second intersection point between the first hydraulic circuit 14 at a high temperature and the second hydraulic circuit 18 at a low temperature, between the first two-way total separation valve 24 and the third two-way total separation valve 28, there is interposed a steam injection device 32, which will be described in detail below. The steam injection device 32 is designed to efficiently mix the steam generated by the steam generating device 12 with the flow of frothed milk coming from the container 20 through the pump 22 and the first two-way total separation valve 24.

Completing the apparatus 10 is a fourth total separation valve 34, preferably two-way, arranged along the first hydraulic circuit 14 at a high temperature. This fourth two-way total separation valve 34 is a proportional valve with a double channel. On a first channel, the valve 34 proportionally modulates the amount of steam exiting the steam generating device 12 so as to obtain, for each individual dispensing operation, a different final temperature of the beverage consisting of the mixture of milk and steam. On the second channel, the valve 34 carries out the resetting of the atmospheric pressure in the ducts in which steam passes at the end of dispensing, so as to avoid negative pressure areas at the moment when the steam condenses.

According to the invention, each between the first two-way total separation valve 24, the second two-way total separation valve 26, the third two-way total separation valve 28 and the fourth two-way total separation valve 34 is provided with an actuator element manufactured with a shape memory alloy. Each actuator element manufactured with a shape memory alloy is electronically controlled by the electronic communication and control board 48. In the second two-way total separation valve 26 for example, the respective actuator element manufactured with a shape memory alloy is capable of accurately calibrating the quantity of air required for frothing the milk. Similarly, in the fourth two-way total separation valve 34, the respective actuator element manufactured with a shape memory alloy is capable of accurately calibrating the quantity of steam and the related latent heat of condensation.

The apparatus 10 provides two main operating steps. A first operating step consists in dispensing the milk and the successive rinsing once dispensing is complete. The moment when the dispensing of the milk is activated, the pump 22 draws the milk from the container 20 and simultaneously air, in order to form the right frothing, through the proportional channel of the second two-way total separation valve 26. The quantity of air may be electronically modulated by means of the electronic communication and control board 48 and the actuator element manufactured with a shape memory alloy of the second two-way total separation valve 26. At this point, milk and air are mixed inside the gear pump 22 in order to obtain the foamed milk. The frothed milk crosses the first two-way total separation valve 24, thus leaving the second hydraulic circuit 18 at a low temperature and therefore the refrigerating group 16.

The milk continues through the steam injection device 32 and through the third two-way total separation valve 28, always pushed by the pump 22 to reach the milk dispensing circuit 30. The selection between hot milk and cold milk occurs simply through the activation or the non-activation of the first proportional channel of the fourth two-way total separation valve 34, which modulates the quantity of steam in order to obtain different temperatures of the beverage.

Once the dispensing of the beverage is complete, the end rinsing operation is carried out. The pump 22 is turned off, thus interrupting the flow of milk, but the first proportional channel, or "steam channel", of the fourth two-way total separation valve 34 is activated (or remains active). At this point, the first two-way total separation valve 24 and the third two-way total separation valve 28 intervene. In particular, the first two-way total separation valve 24 remains closed so that the steam does not enter the second hydraulic circuit 18 at a low temperature but eliminates all the milk residuals in the first hydraulic circuit 14 at a high temperature and up to the dispensing circuit 30 by crossing also the third two-way total separation valve 28, which was kept open. This operation allows the milk to be eliminated from all the ducts of the first hydraulic circuit 14 at a high temperature, that is under dangerous conditions for the buildup of bacteria, by keeping isolated the second hydraulic circuit 18 at a low temperature, by definition deemed safe for the conservation of the milk itself.

The saturated steam, due to the high temperature, has the advantage of being an optimal sanitizer in addition to having an increased cleansing power. The saturated steam also has the advantage of being very efficient in terms of water consumption. If the same operation were performed with water, an unacceptable quantity would be used, which would then end up in the beverage. Moreover, the ducts of the first hydraulic circuit 14 at a high temperature would remain filled with water. Instead, in the case of steam, once the rinsing is complete, the third two-way total separation valve 28 may also be closed and the second channel of the fourth two-way total separation valve 34 may be opened in order to evacuate the excess steam, thus restoring the atmospheric pressure and therefore keeping empty the ducts of the first hydraulic circuit 14 at a high temperature.

A second step of operating the apparatus 10 consists of the evening washing, i.e. carried out at the end of the daily operations of the apparatus 10 itself. The apparatus 10 is indeed optimized also to perform, in an almost completely automatic manner, the day-end washing and sanitizing operations of the circuits. To carry out the evening washing, the operator is to remove the milk container 20 and use another container (not shown) dedicated to the wash cycle. These operations are also imposed by HACCP protocol. Once the new container selected for washing has been positioned in the refrigerating group 16 and has been filled with water to the suitable level (about 2 litres), a liquid detergent may also be added to the water which promotes the washing and sanitizing of the circuits of the apparatus 10.

At this point, the automatic wash cycle is started. The first proportional channel, or "steam channel", is activated of the fourth two-way total separation valve 34, while the third two-way total separation valve 28 is kept closed. Thereby, the steam passes through the first two-way total separation valve 24, the pump 22 and, arriving in the container of the washing liquid, will heat such washing liquid. By keeping closed the third two-way total separation valve 28, the steam will not be outlet from the dispensing circuit 30, thus avoiding the evaporation through such dispensing circuit 30.

When the washing liquid reaches the temperature desired, usually equal to 80° C. required to get the most from the cleansing and the sanitizing, the pump 22 is also activated and begins to draw hot water with detergent. The washing liquid passes through the pump 22, the first two-way total separation valve 24, the steam injection device 32 and the third two-way total separation valve 28, by flowing in the dispensing circuit 30 and thus sanitizing the whole second hydraulic circuit 18 at a low temperature and also such dispensing circuit 30.

Once the drawing of the washing liquid is complete, the cycle is interrupted to allow the operator to reload the container with water, this time without detergent. By repeating the same cycle, the apparatus 10 will eliminate all possible detergent residuals in the circuits. Once all the water without detergent is drawn, the apparatus 10 continues with the step of rinsing with steam alone, as occurs at the end of the individual milk dispensing operation, in order to further sanitize the ducts and eliminate the water residuals.

A particular description is to be dedicated to the steam injection device 32. This steam injection device 32 should have specific features in order to maximize both the condensation of the steam on the fluid (milk) and the transfer of heat without however compromising the quality of the frothing. This compromise is obtained by conveniently balancing the sizes and geometries of the ducts belonging to the steam injection device 32.

With reference to the sectional view of FIG. 2, the steam injection device 32 comprises a first milk inlet duct 36 configured to receive the milk coming from the container 20 through the pump 22 and the first two-way total separation valve 24, a second steam inlet duct 38 configured to receive the steam coming from the steam generating device 12 through the fourth two-way total separation valve 34, and an outlet duct 40 configured to expel the heated milk toward the dispensing circuit 30 through the third two-way total separation valve 28. A mixing chamber 42 is interposed between the first milk inlet duct 36, the second steam inlet duct 38 and the outlet duct 40.

In the steam injection device 32, the direction A-A of development of the first milk inlet duct 36 and of the outlet duct 40, i.e. the main direction of the flow of milk, is perpendicular to the direction B-B of development of the second steam inlet duct 38, i.e. the direction of the flow of steam. Moreover, the intersection point 44 of the second steam inlet duct 38 with the mixing chamber 42, i.e. the injection point of the steam, is retracted, with reference to the direction of the flows, with respect to the intersection point 46 of such mixing chamber 42 with the outlet duct 40, i.e. the outlet point of the heated milk. This configuration allows the main flow of the milk not to be disturbed by the speed of the steam flow.

In order to keep the proper condition of flow rates and pressures, the passage section C of the first milk inlet duct 36 is smaller than the passage section D of the second steam inlet duct 38, while the passage section D of the second steam inlet duct 38 is in turn smaller than the passage section E of the outlet duct 40.

The difference between the passage section C of the first milk inlet duct 36 and the passage section E of the outlet duct 40 causes a difference in speed of the main flow of milk which induces a slight depression due to the Venturi effect. This depression improves the mixing between steam and milk by transferring more heat without inducing boiling and localized over temperatures of the milk.

Thus, it has been seen that the automatic apparatus for heating and frothing milk according to the present invention achieves the aims set forth above.

The automatic apparatus for heating and frothing milk of the present invention thus conceived is susceptible in any case to many modifications and variants, all falling within the same inventive concept; moreover, all the details can be replaced by technically equivalent elements. Practically, the materials used, as well as their shapes and dimensions, can be of any type according to the technical requirements.

The scope of protection of the invention is therefore defined by the appended claims.

The invention claimed is:

1. An automatic apparatus (10) for heating and frothing milk, comprising a steam generating device (12), configured for generating steam for heating milk, a first hydraulic circuit (14) at high temperature, operatively associated with said steam generating device (12), a refrigerating group (16), configured for maintaining the milk conservation temperature, and a second hydraulic circuit (18) at low temperature, operatively associated with said refrigerating group (16), said refrigerating group (16) comprising at least one milk container (20) and at least one pump (22), configured for sucking milk from said container (20), the apparatus (10) comprising:

a first total separation valve (24), configured to carry out the separation of the second hydraulic circuit (18) at low temperature from the first hydraulic circuit (14) at high temperature;

a second total separation valve (26), configured to modulate the amount of air sucked by the pump (22);

a third total separation valve (28), configured to separate both the first hydraulic circuit (14) at high temperature, and the second hydraulic circuit (18) at low temperature from a circuit (30) for dispensing milk arranged outside of the apparatus (10);

a steam injection device (32), configured to mix the steam generated by the steam generating device (12) with the flow of frothed milk coming from the container (20) through the pump (22) and the first total separation valve (24); and a fourth total separation valve (34), configured to modulate the amount of steam exiting from the steam generating device (12).

the apparatus (10) being characterised in that said at least one pump (22) and said first total separation valve (24) are housed inside the refrigerating group (16), said apparatus (10) comprising a control and communication electronic board (48) configured to control the operation of all of the components of said apparatus (10), wherein each of the first total separation valve (24), the second total separation valve (26), the third total separation valve (28) and the fourth total separation valve (34) is provided with an actuator element manufactured with a shape memory alloy, and wherein each actuator element manufactured with a shape memory alloy is electronically controlled by said control and communication electronic board (48).

2. The apparatus (10) according to claim 1, characterised in that the second total separation valve (26) is arranged in a first intersection point between the first hydraulic circuit (14) at high temperature and the second hydraulic circuit (18) at low temperature and is a double-channel proportional valve, wherein on a first channel said valve (26) is configured to proportionally modulate the amount of air sucked by the pump (22), so as to obtain a different emulsion of the milk for each single dispensing operation, and wherein on the second channel said valve (26) carries out the loading of the water to be introduced into the steam generating device (12).

3. The apparatus (10) according to claim 1, characterised in that the fourth total separation valve (34) is arranged along the first hydraulic circuit (14) at high temperature and is a double channel proportional valve, wherein on a first channel said valve (34) proportionally modulates the amount of steam exiting from the steam generating device (12), so as to obtain a different final temperature of the mixture of milk and steam for each single dispensing operation, and wherein on the second channel said valve (34) carries out the resetting of the atmospheric pressure in the ducts in which the steam passes at the end of the dispensing, so as to avoid negative pressure areas at the moment when the steam condenses.

4. The apparatus (10) according to claim 1, characterised in that the steam injection device (32) is arranged in a second intersection point between the first hydraulic circuit (14) at high temperature and the second hydraulic circuit (18) at low temperature, between the first total separation valve (24) and the third total separation valve (28).

5. The apparatus (10) according to claim 4, characterised in that the steam injection device (32) comprises a first milk inlet duct (36), configured to receive the milk coming from the container (20) through the pump (22) and the first total separation valve (24), a second steam inlet duct (38), configured to receive the steam coming from the steam generating device (12) through the fourth total separation valve (34), and an outlet duct (40), configured to discharge the heated milk towards the milk circuit (30) through the third total separation valve (28), between the first milk inlet duct (36), the second steam inlet duct (38) and the outlet duct (40) a mixing chamber (42) being arranged.

6. The apparatus (10) according to claim 5, characterised in that the development direction (A-A) of the first milk inlet duct (36) and of the outlet duct (40), namely the main direction of the milk flow, is perpendicular to the development direction (B-B) of the second steam inlet duct (38), i.e. the direction of the steam flow.

7. The apparatus (10) according to claim 6, characterised in that the intersection point (44) of the second steam inlet duct (38) with the mixing chamber (42), i.e. the steam injection point, is set back, with reference to the flows direction, with respect to the intersection point (46) of said mixing chamber (42) with the outlet duct (40), namely the outlet point of the heated milk.

8. The apparatus (10) according to claim 6, characterised in that the passage section (C) of the first milk inlet duct (36) is smaller than the passage section (D) of the second steam inlet duct (38), whereas the passage section (D) of the second steam inlet duct (38) is in turn smaller than the passage section (E) of the outlet duct (40).

* * * * *